Sept. 1, 1964 H. MOSES 3,146,622
ATMOSPHERIC EDDY DISTURBANCE DETECTOR
Filed May 19, 1961 2 Sheets-Sheet 1
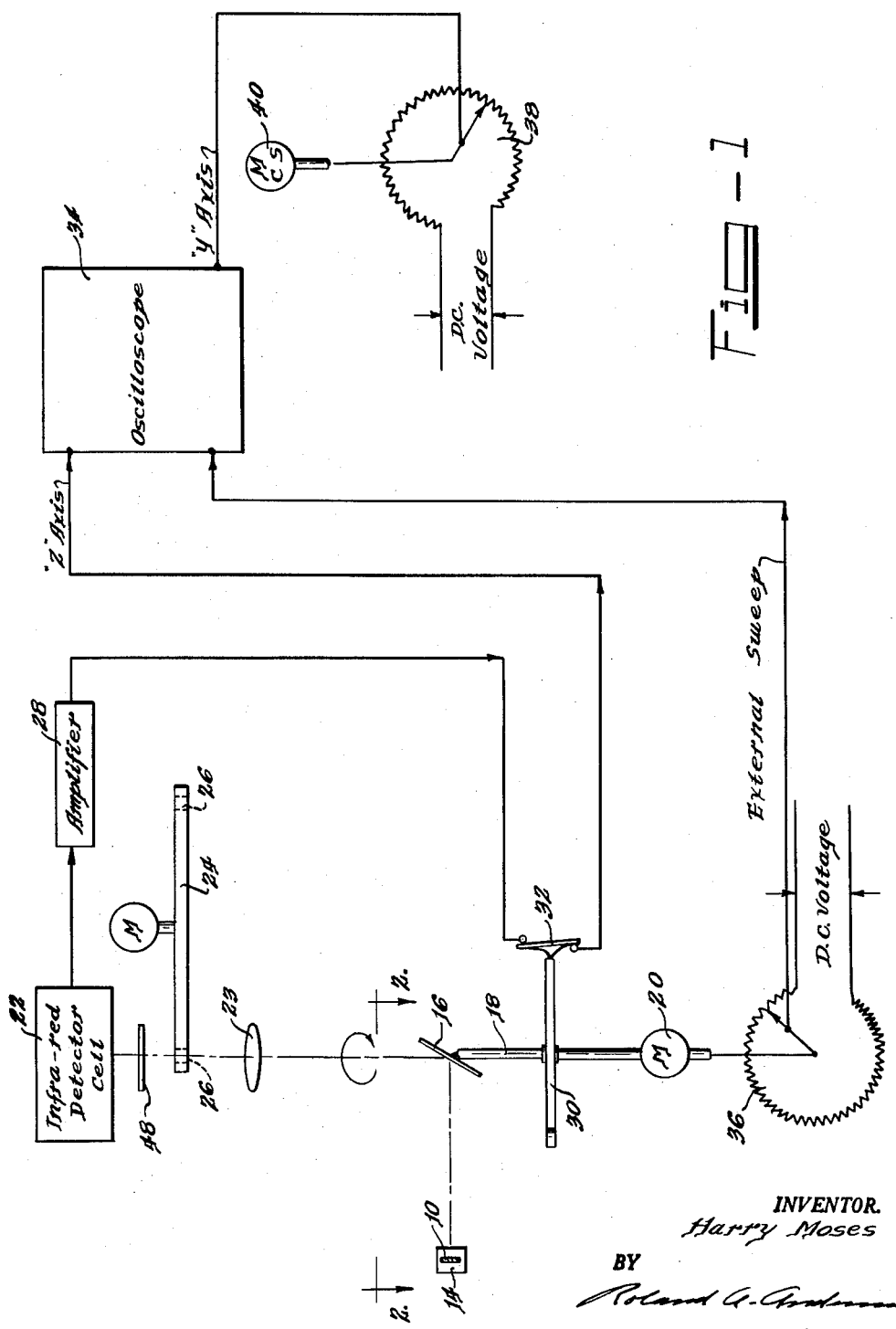
INVENTOR.
*Harry Moses*
BY
*Roland A. Anderson*
*Attorney*

Sept. 1, 1964            H. MOSES            3,146,622
ATMOSPHERIC EDDY DISTURBANCE DETECTOR
Filed May 19, 1961            2 Sheets-Sheet 2
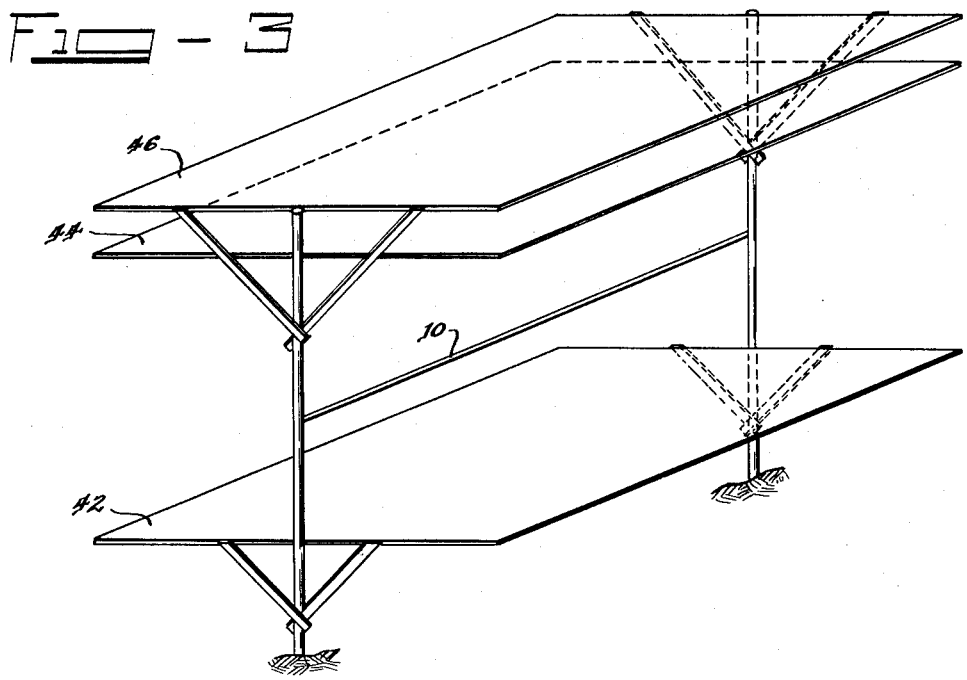
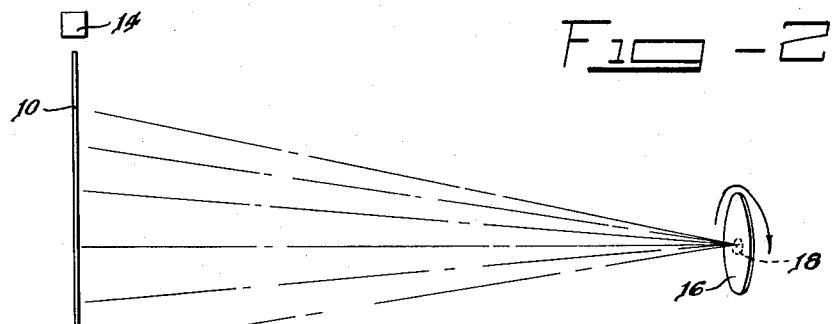
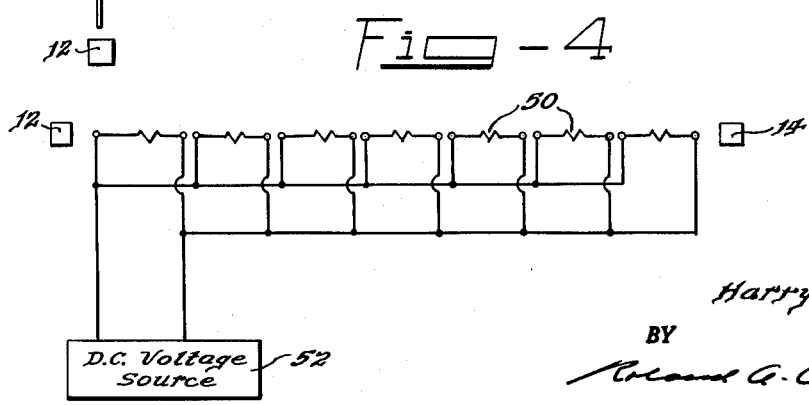
INVENTOR.
Harry Moses
BY
Roland G. Anderson
Attorney United States Patent Office 3,146,622
Patented Sept. 1, 1964

3,146,622
ATMOSPHERIC EDDY DISTURBANCE DETECTOR
Harry Moses, Park Forest, Ill., assignor to the United States of America as represented by the United States Atomic Energy Commission
Filed May 19, 1961, Ser. No. 111,415
8 Claims. (Cl. 73—355)

This invention relates to devices for the measurement of thermal and momentum eddies in the atmosphere and more specifically to a device for the measurement of isotach and isotherm patterns in the atmosphere in either a vertical or horizontal plane.

In determining the physical location of apparatus for exhausting contaminated or noxious gases, particular attention must be paid to the diffusion process of the atmosphere. In studying this process it is of prime importance to know the temperature and momentum fields in the lower atmospheric layers. Presently available devices use a point source detector such as a thermocouple. However, when a point source detector is used, the air coming in contact therewith provides information on the variation in temperature or velocity with respect to time which may only be translated into variation with respect to distance in one dimension i.e. a line. Thus, to obtain even an approximate two dimensional or plane representation of the temperature or momentum fields a large number of point sources and recording apparatus therefor are needed.

It is therefore one object of this invention to provide a device for measuring isotach patterns in the atmosphere in either a vertical or horizontal plane.

It is another object of this invention to provide a device for measuring isotherm patterns in the atmosphere in either a vertical or horizontal plane.

Other objects will become more apparent as the detailed description proceeds.

In general, the present invention comprises a tape or heated wire suspended in the atmosphere, an infrared detector adapted to scan the tape or wire periodically and to detect thermal changes thereon and means for reading the output from the infrared detector whereby a two dimensional pattern of isotachs or isotherms i.e. in a plane may be constructed.

More complete understanding of the invention will best be obtained from consideration of the accompanying drawings in which:

FIG. 1 is a block schematic representation of a preferred embodiment for the present invention in measuring isotherms.

FIG. 2 is a vertical view of FIG. 1 along 2—2.

FIG. 3 is a representation of a device for the shielding of the heat responsive apparatus in FIG. 1 from solar and ground radiation.

FIG. 4 is a schematic representation of modified heat sensing apparatus for use in the embodiment of FIG. 1 in measuring isotachs.

FIG. 1 illustrates an apparatus for the measurement of isotherm patterns in a plane in the atmosphere. A 50 to 100 foot long plastic tape 10 is suspended several feet above the ground in the atmosphere and oriented perpendicular to the wind flow. The tape 10 is opaque to infrared radiation and has low density, specific heat and thermal conductivity. It is also desirable that the thickness of the tape 10 should be small as possible in order to minimize the thermal capacity per unit area thereof. As shown in FIG. 2, a black body radiation reference source 12 is disposed at one end of tape 10 and another black body radiation reference source 14 is disposed at the other end. The two radiation sources 12 and 14 radiate different temperature values to give a predetermined temperature differential therebetween.

A plane mirror 16 is mounted on an extensible shaft 18 of motor 20 and adapted to rotate therewith. An infrared detector 22, such as a liquid-nitrogen-cooled gold-doped germanium cell, is mounted close to the plane mirror 16, preferably above it. A lens 23 transparent to infrared radiation, such as an arsenic trisulphide lens, is disposed between mirror 16 and the infrared detector 22. The plane mirror 16 is aligned so that as it rotates it scans along the black body radiation reference sources 12 and 14 and the tape 10 and focuses the infrared radiation emanating therefrom via the lens 23 on the infrared detector 22.

A motor driven disk 24, painted black on both sides and having apertures 26 therethrough around the circumference thereof, is disposed between the lens 23 and the infrared detector 22. The disk 24 is positioned so that as it rotates, the apertures 26 therein are successively aligned to permit transmission therethrough from the mirror 16 to the infrared detector 22. Thus, the infrared detector 22 alternately sees the reflected heat from the mirror 16 and the black surface of the disk 24. As the mirror 16 scans along the radiation reference sources 12 and 14 and the tape 10, the output from the infrared detector 22 is a series of pulses whose voltage heights are proportional to the temperature of that portion of the tape 10 and the radiation reference sources 12 and 14 which is being scanned.

Calibration of the output pulses from the infrared detector 22 is achieved from the two radiation reference sources 12 and 14. As these two sources 12 and 14 are scanned, the output pulses from the infrared detector 22 will have differing amplitudes directly proportional to the heat radiating from the sources 12 and 14. Thus, the difference in temperature of the radiation sources 12 and 14 divided by the difference in voltage amplitude of the pulses resulting therefrom gives degrees of temperature per unit of voltage output.

The output from the infrared detector 22 is fed to an amplifier 28. The output from the amplifier 28 is a fluctuating D.-C. voltage which is proportional to the temperature observed on the tape.

A cam 30 is mounted on and adapted to rotate with the extensible shaft 18 of motor 20. The cam 30 is cut so that it closes a micro-switch 32 during that portion of a revolution of the motor 20 when the mirror 16 is scanning the tape 10 and radiation sources 12 and 14. The output from the amplifier 28 is connected through the micro-switch 32 to the "Z" modulation circuit of an oscilloscope 34 where it modulates the intensity of the beam thereof.

The wiper arm of a potentiometer 36 is mounted on and adapted to rotate with the extensible shaft 18 of motor 20. A D.-C. voltage is applied across the potentiometer 36 and the output voltage taken from the wiper blade thereof is fed to the external sweep of oscilloscope 34. Another potentiometer 38 has its wiper arm driven by a constant speed motor 40. A D.-C. voltage is impressed across the terminals of the potentiometer 38 and the output voltage taken from the wiper blade thereof is fed to the vertical axis of oscilloscope 34.

Obviously, various combinations of speeds of rotation for motors 40 and 20 and disk 24 are possible. The following rotative speeds have been found to give acceptable results when scanning a 50' tape 10 with mirror 16 disposed approximately 25' therefrom. The drive motor 20 was caused to rotate at a speed of 4 revolutions per second, thus, the tape was scanned by mirror 16 four times per second. The disk 24 was rotated at a speed such that the infrared detector saw the mirror 16 through apertures 26 twenty-four hundred times per second. The speed of motor 40 was adjusted to give one revolution per minute. The horizontal sweep of oscilloscope 34 was expanded so that only that portion of the sweep was displayed when the mirror 16 was scanning the tape 10 and radiation reference sources 12 and 14.

Thus, the presentation as seen on the oscilloscope 34 was a raster of horizontal lines having a slight slope due to the vertical sweep. The intensity of the lines varied therealong proportional to the temperature of the tape at that portion of the sweep. Each of the horizontal lines in the raster therefore presented a pictorial view of the temperatures along the tape 10 at one instant and the whole raster gave a pictorial view of temperatures along the tape 10 for a one minute period of time.

To further improve the accuracy of the device of FIG. 1, shields, as shown in FIG. 3, are added to eliminate solar and ground radiation. The ground radiation shield 42 is mounted below the suspended tape 10 and is painted black on the side adjacent the tape 10 and is highly polished on the other side. The solar radiation shields 44 and 46 are mounted above the tape 10 and similarly are black on the sides thereof which are adjacent the tape 10 and highly polished on the other sides. Further protection from solar radiation is effected by the insertion of a filter 48 in FIG. 1 in front of the infrared detector 22. The filter 48 stops all radiation of wavelength less than 1.6 microns, thus eliminating solar radiation. Though not shown in FIG. 1, the infrared cell 22, disk 24, and the filter 48 were enclosed in one cabinet. Also inserted in the cabinet was a thermistor to check any temperature change occurring in the cabinet so that compensation could then be made for a corresponding change in the radiated temperature from disk 24.

For the measurement of isotachs, the embodiment of FIG. 1 remains the same except that the tape 10 is replaced by the apparatus of FIG. 4. In FIG. 4 a plurality of high resistance, low temperature coefficient wires 50, preferably nichrome wires, are suspended in series alignment in the atmosphere. Each of the wires 50 are short (approximately 6″) and have identical resistance values so that a constant uniform temperature may be generated therealong by the application of a voltage thereto. Each of the wires 50 are electrically connected in parallel across a D.C. source 52. The current through each of the wires 50 is adjusted so that a predetermined reference temperature is generated therein above the ambient temperature of the atmosphere. As the air moves over the wires 50, a cooling effect will be produced thereon proportional to the velocity of the air. Thus, the scanning and measuring apparatus of FIG. 1 will present on the oscilloscope 34 an isotach display similar to that for the isotherm.

It should be noted that other readout systems may be used with the apparatus of FIG. 1. For example, to obtain an "A" scope presentation, the output from amplifier 28 may be fed through micro-switch 32 to the vertical axis of the oscilloscope 34 and the horizontal sweep thereof synchronized as shown with the motor 20. With a camera mounted on the oscilloscope 34, pictures may be taken of the successive sweeps which in turn may be summated to give an isotherm or isotach pattern representation in a plane. Further, the output may be directly transposed onto tape for subsequent computer analysis.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and illustrated above, but should be determined only in accordance with the appended claims.

What is claimed is:

1. A device for measuring isotach and isotherm patterns in the atmosphere comprising means aligned and suspended in the atmosphere responsive to the heating effect therefrom, a first radiation reference source disposed at one end of said heat responsive means, a second radiation reference source of different temperature than said first reference source disposed at the other end of said heat responsive means, means for shielding said heat responsive means from solar and ground radiation, an infrared detector, reflective means for scanning along said reference sources and said heat responsive means and transmitting the radiation therefrom to said infrared detector whereby temperature changes therealong are detected, and means for recording said detected temperature changes.

2. An isotherm pattern measuring device comprising a tape having the properties of low density, low thermal conductivity, low specific heat and opaque to infrared radiation, said tape being aligned and suspended in that portion of the atmosphere wherein the isotherm patterns are to be measured; means for shielding said tape from solar and ground radiation; infrared means for periodically scanning said tape and detecting the temperature changes therealong; and means for recording the detected temperature changes along said tape.

3. The device according to claim 2 wherein said temperature change detecting means comprise a plane mirror, means for causing said mirror to rotoate, an infrared detector, a lens transparent to infrared radiation, said mirror being aligned to focus the radiation from said tape on said infrared detector via said lens, switching means adapted to gate the output of said infrared detector for that portion of a revolution when said mirror scans said tape, and means for pulsing the reflected heat from said tape as said mirror scans therealong.

4. The device according to claim 3, said recording means comprising an amplifier having a D.-C. voltage output, the input of said amplifier being connected to the output of said infrared detector, an oscilloscope, a connection between the output of said amplifier and the beam intensity control of said oscilloscope, means for synchronizing the horizontal sweep of said oscilloscope with the rotation of said mirror, and means for vertically displacing each horizontal sweep of said oscilloscope, whereby a visual representation of isotherm patterns in a plane is created.

5. An isotherm pattern measuring device comprising a plastic tape having the properties of low density, low thermal conductivity, low specific heat and opaque to infrared radiation; said plastic tape being suspended and aligned perpendicular to the wind flow in that portion of the atmosphere wherein the isotherm patterns are to be measured; means for shielding said tape from solar and ground radiation; a first radiation reference source disposed at one end of said plastic tape; a second radiation reference source of different temperature than said first radiation reference source disposed at the other end of said plastic tape; a plane mirror; an infrared detector; a lens transparent to infrared radiation; a motor having an extensible shaft; said mirror being mounted on the shaft of said motor, adapted to rotate therewith and aligned to focus the radiation from said radiation reference source and said plastic tape on said infrared detector via said lens; a rotatable disk disposed between said infrared detector and said mirror; means for rotating said disk; said disk having a plurality of apertures around the circumference thereof; each of the apertures of said disk being aligned to permit radiation transmission therethrough from said mirror to said infrared detector; an amplifier having a D.-C. output; the input to said amplifier being connected to the output of said infrared detector; a switch; a cam mounted on the shaft of said motor adapted to rotate therewith and close said switch for that portion of a revolution when said mirror scans said radiation reference sources and said plastic tape; an oscilloscope; a connection between the beam intensity control of said oscilloscope and the output of said amplifier through said switch; means for synchronizing the horizontal sweep of said oscilloscope with the rotation of said mirror and means for vertically displacing each horizontal sweep of said oscilloscope, whereby a visual representation of isotherm patterns in a plane is created.

6. An isotherm pattern measuring device comprising a plastic tape having the properties of low density, low thermal conductivity, low specific heat and opaque to infrared radiation; said plastic tape being suspended and aligned perpendicular to the wind flow in that portion of the atmosphere wherein the isotherm patterns are to be meausred; a first solar radiation shield disposed above said plastic tape; said first solar radiation shield being black on the side adjacent said plastic tape and highly reflective on the other side thereof; a second solar radiation shield disposed above said first solar radiation shield; said second solar radiation shield being black on the side adjacent said first solar radiation shield and highly reflective on the other side thereof; a ground radiation shield disposed below said plastic tape; said ground radiation shield being black on the side adjacent said plastic tape and highly reflective on the other side thereof; a first radiation reference source disposed at one end of said plastic tape; a second radiation reference source of different temperature than said first radiation reference source disposed at the other end of said plastic tape; a plane mirror; an infrared detector; a lens transparent to infrared radiation; a solar radiation filter responsive to radiation having wavelengths higher than 1.6 microns disposed between said infrared detector and said lens; a first motor having an extensible shaft; said mirror being mounted on the shaft of said motor, adapted to rotate therewith and aligned to focus the radiation from said radiation reference sources and said plastic tape on said infrared detector via said lens; a rotatable disk disposed between said solar radiation filter and said lens; said disk having a plurality of apertures around the circumference thereof; each of the apertures of said disk being aligned to permit radiation transmission therethrough from said mirror to said infrared detector; means for rotating said disk; an amplifier having a D.-C. output; the input to said amplifier being connected to the output of said infrared detector; a switch; an oscilloscope; a cam mounted on the shaft of said first motor adapted to rotate therewith and close said switch for that portion of a revolution when said mirror scans said radiation reference sources and said plastic tape; a connection between the beam intensity control of said oscilloscope and the output of said amplifier through said switch; a D.-C. voltage supply; a first potentiometer connected across said D.-C. voltage supply; the wiper arm of said first potentiometer being mechanically adapted to rotate with the shaft of said first motor and electrically connected to the external sweep of said oscilloscope; a second motor; a second potentiometer connected across said D.-C. voltage supply; the wiper arm of said second potentiometer being mechanically driven by the shaft of said second motor and electrically connected to the vertical input to said oscilloscope.

7. An isotach pattern measuring device comprising a plurality of identical high resistance, low temperature coefficient wires aligned and suspended in the atmosphere; means for generating equal currents flowing in each of said wires; means for shielding said wires from solar and ground radiation; infrared means for periodically scanning said wires and detecting the temperature changes therealong; and means for recording the detected temperature changes along said wires.

8. An isotach pattern measuring device comprising a plurality of identical high resistance, low temperature coefficient wires aligned and suspended in the atmosphere; a D.-C. voltage source; each of said wires being in parallel electrical connection across said D.-C. voltage source; means for shielding said wires from solar and ground radiation; a first radiation reference source disposed at one end of said aligned wires; a second radiation reference source of different temperature than said first radiation source disposed at the other end of said aligned wires; a plane mirror, an infrared detector; a lens transparent to infrared radiation; a motor having an extensible shaft; said mirror being mounted on the shaft of said motor, adapted to rotate therewith, and aligned to focus the radiation from said radiation reference sources and said wires on said infrared detector via said lens; a rotatable disk disposed between said infrared detector and said lens; said disk having a plurality of apertures around the circumference thereof; each of the apertures of said disk being aligned to permit radiation transmission therethrough from said mirror to said infrared detector; means for rotating said disc; an amplifier having a D.-C. output; the input to said amplifier being connected to the output of said infrared detector; a switch; an oscilloscope; a cam mounted on the shaft of said motor, adapted to rotate therewith and close said switch for that portion of a revolution when said mirror scans said radiation reference sources and said wires; a connection between the beam intensity control of said oscilloscope and the output of said amplifier through said switch; means for synchronizing the horizontal sweep of said oscilloscope with the rotation of said mirror; and means for vertically displacing each horizontal sweep of said oscilloscope, whereby a visual representation of an isotach pattern in a plane is created.

References Cited in the file of this patent
UNITED STATES PATENTS

| | | |
|---|---|---|
| 1,901,192 | Reinhardt et al. | Mar. 14, 1933 |
| 2,234,122 | Heck | Mar. 4, 1941 |
| 2,900,519 | Sorel et al. | Aug. 18, 1959 |
| 2,909,924 | Flook et al. | Oct. 27, 1959 |